United States Patent
Rosher et al.

(10) Patent No.: US 10,881,092 B2
(45) Date of Patent: Jan. 5, 2021

(54) ADJUSTABLE TENSION FISHING LINE RELEASE APPARATUS

(71) Applicants: Raymond A. Rosher, Miami, FL (US); Marvin J. Marshall, Jr., Micco, FL (US)

(72) Inventors: Raymond A. Rosher, Miami, FL (US); Marvin J. Marshall, Jr., Micco, FL (US)

(73) Assignee: R&R Tackle, Inc., Miami, FL (US)

(*) Notice: Subject to any disclaimer, the term of this patent is extended or adjusted under 35 U.S.C. 154(b) by 346 days.

(21) Appl. No.: 15/662,420

(22) Filed: Jul. 28, 2017

(65) Prior Publication Data

US 2018/0027790 A1 Feb. 1, 2018

Related U.S. Application Data

(60) Provisional application No. 62/368,874, filed on Jul. 29, 2016.

(51) Int. Cl.
| | | |
|---|---|---|
| *A01K 91/06* | (2006.01) | |
| *A01K 91/047* | (2006.01) | |
| *A01K 91/00* | (2006.01) | |
| *A01K 91/08* | (2006.01) | |

(52) U.S. Cl.
CPC .............. *A01K 91/06* (2013.01); *A01K 91/00* (2013.01); *A01K 91/047* (2013.01); *A01K 91/08* (2013.01)

(58) Field of Classification Search
CPC .... A01K 91/03; A01K 91/047; A01K 91/053; A01K 91/06; A01K 91/08

USPC ................................ 43/4, 43.1, 43.12, 43.13
See application file for complete search history.

(56) References Cited

U.S. PATENT DOCUMENTS

| | | | | |
|---|---|---|---|---|
| 3,077,048 A | * | 2/1963 | Strumpf .................. | A01K 91/08 43/43.12 |
| 3,905,148 A | * | 9/1975 | Naone ..................... | A01K 91/08 43/43.12 |
| 3,930,330 A | * | 1/1976 | Black ..................... | A01K 91/08 43/17 |
| 4,069,611 A | * | 1/1978 | Dusich .................... | A01K 91/08 43/43.12 |
| 4,173,091 A | * | 11/1979 | Emory, Jr. ............. | A01K 91/08 43/43.12 |
| 4,417,414 A | * | 11/1983 | Hood ...................... | A01K 91/08 43/43.12 |
| 4,428,142 A | * | 1/1984 | Shedd .................... | A01K 91/08 43/42.04 |
| 4,453,336 A | * | 6/1984 | Lowden ................. | A01K 91/08 24/532 |

(Continued)

*Primary Examiner* — Darren W Ark
*Assistant Examiner* — Steven J Shur
(74) *Attorney, Agent, or Firm* — Albert Bordas, P.A.

(57) ABSTRACT

An offshore fishing apparatus aligns properly, is light weight, and is consistently adjustable by the user to their desired tension for smooth release of their fishing line when a fish strikes or when any force overcomes the applied tension placed on the fishing line release arm. The device further includes a proximal beveled entry and exit including a pivot ball with an aperture, through which a kite or connection line is run through. The pivot ball allows the device to pivot in the direction the fishing line moves. The device is advantageously light weight, in part due to lightweight materials used to construct the device without reducing the device's performance.

4 Claims, 4 Drawing Sheets

(56) References Cited

U.S. PATENT DOCUMENTS

| | | | | |
|---|---|---|---|---|
| 4,574,518 A | * | 3/1986 | Shedd | A01K 91/08 43/42.04 |
| 4,611,423 A | * | 9/1986 | Rupp | A01K 91/08 43/43.12 |
| 4,700,505 A | * | 10/1987 | Weber | A01K 91/08 43/43.12 |
| 5,337,510 A | * | 8/1994 | McCue | A01K 91/08 43/43.12 |
| 5,564,214 A | * | 10/1996 | Tsurufuji | A01K 87/005 43/24 |
| 7,178,284 B2 | * | 2/2007 | Chamberlain | A01K 91/08 43/43.12 |

\* cited by examiner

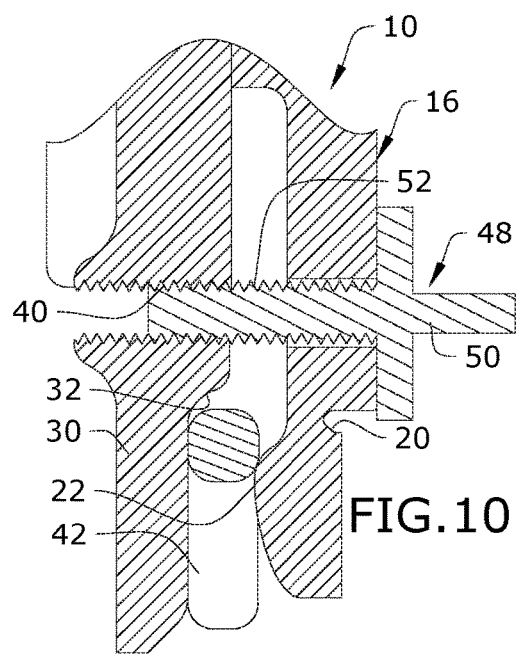
FIG.10
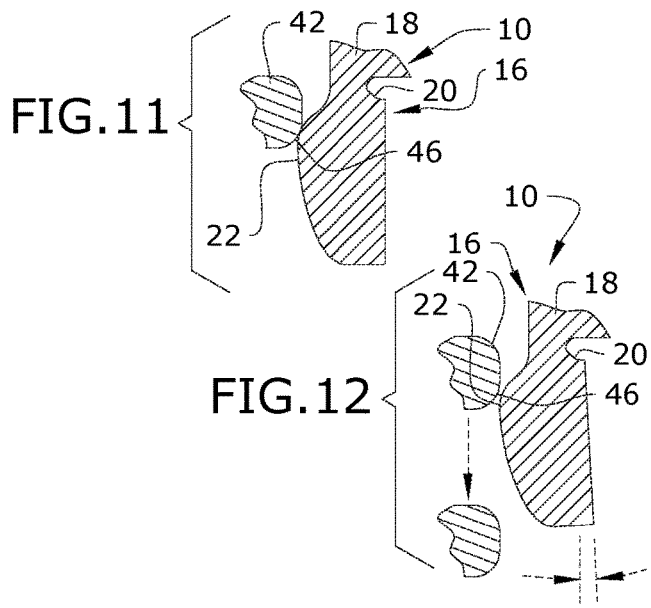
FIG.11
FIG.12
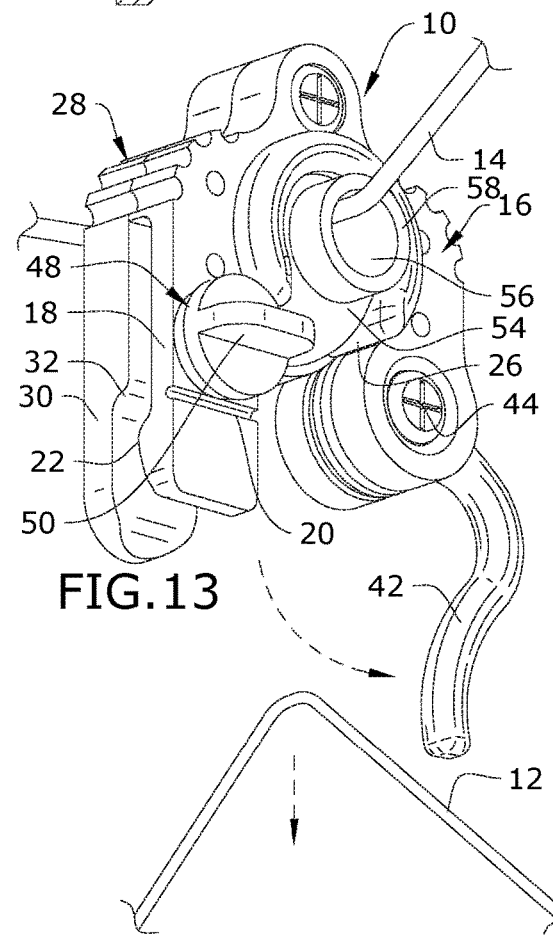
FIG.13
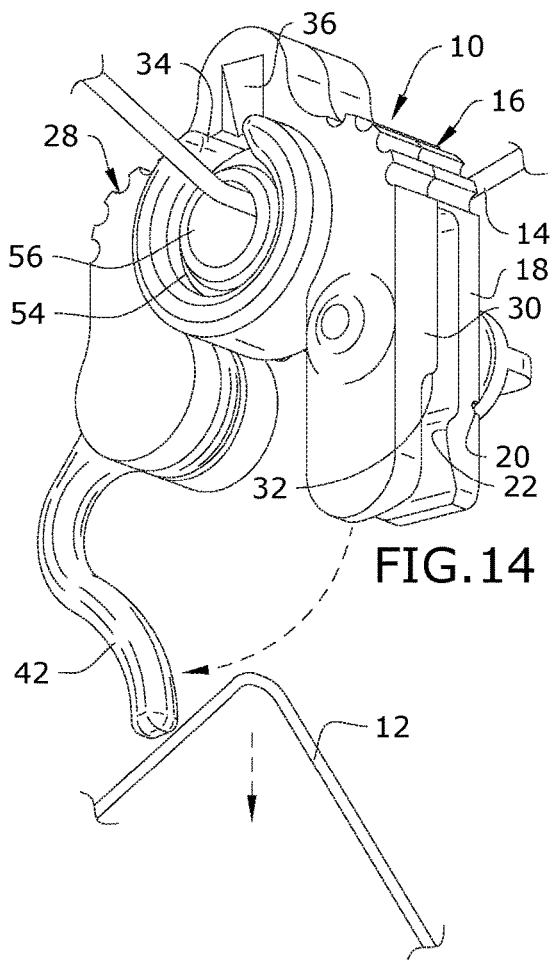
FIG.14

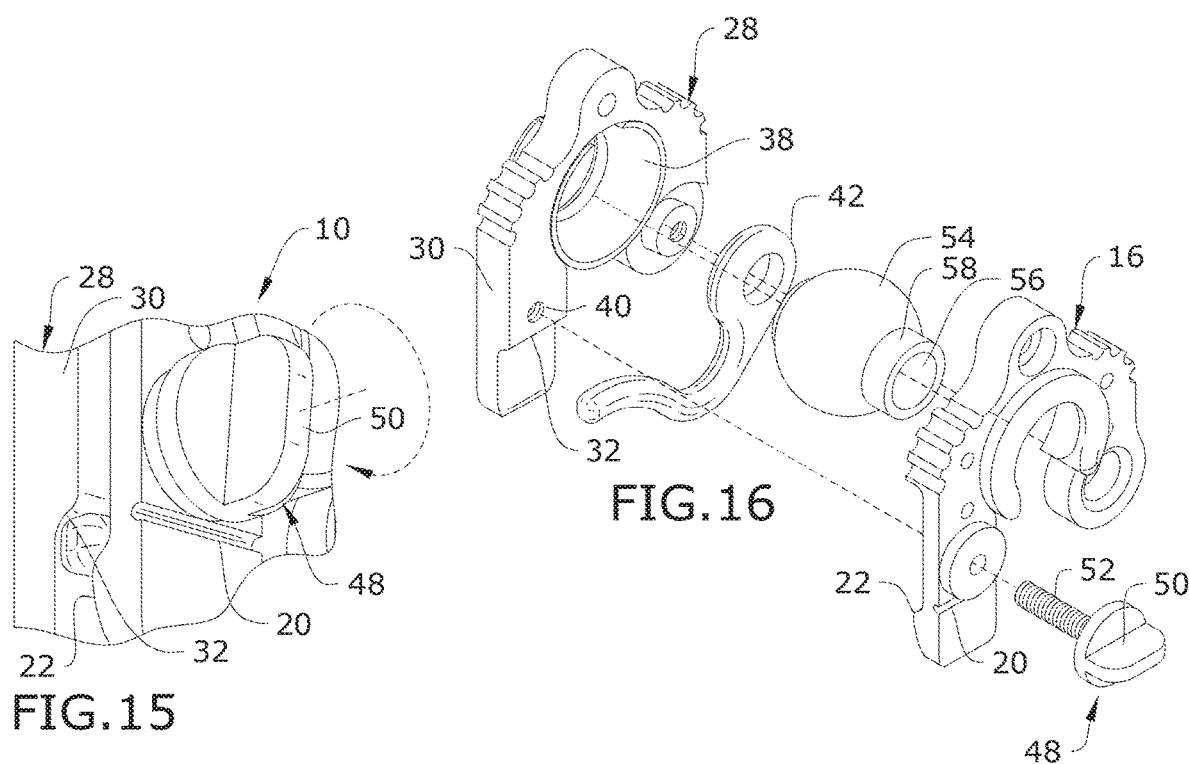

ADJUSTABLE TENSION FISHING LINE RELEASE APPARATUS

CROSS-REFERENCE TO RELATED APPLICATION

This application claims the benefit of priority of U.S. provisional application No. 62/368,874, filed on Jul. 29, 2016, the contents of which are herein incorporated by reference.

BACKGROUND OF THE INVENTION

This invention relates to offshore fishing, and more particularly, to a fishing line holding release apparatus for an improved offshore fishing technique.

Fishing lines have been known to tangle on, break, or not release smoothly from existing fishing line release arms due to the improper angle, misalignment, and small diameter of the release arms present in prior art. The release tension adjustment range is not sufficient, precise, or consistent enough in the prior art to facilitate optimal uses in the varying fishing techniques and applications. The overall weight of existing devices is significant, and has an adverse effect on the varying fishing techniques and applications, such as kite fishing where multiple fishing line release apparatus are attached to a single kite line, which are attached to a single kite.

There exists a need for a device that is lightweight and aligns properly, is rotational and pivots, and is reliably and consistently adjustable by the user to their desired tension for proper and smooth release of their fishing line.

SUMMARY

The present invention relates to an offshore fishing apparatus that aligns properly, is light weight, and is consistently adjustable by the user to their desired tension for smooth release of their fishing line when a fish strikes or when any force overcomes the applied tension placed on the fishing line release arm. The apparatus is advantageously light weight, in part due to lightweight materials used to construct the device without reducing the device's performance.

In one embodiment, a fishing apparatus comprises an apparatus body, an adjustable thumb screw coupled to the apparatus body, and a release arm gripping mechanism at a distal end of the apparatus body, the release arm gripping mechanism holding a release arm, and the release arm gripping mechanism being able to increase or decrease a tension on the release arm when the adjustment thumb screw is tightened or loosened.

In one embodiment, the apparatus further comprises a beveled entry and exit at a proximal end of the apparatus body, wherein a kite line or other connection line is run through an aperture of the beveled entry and exit.

In one embodiment, the apparatus further comprises a pivot ball at a proximal end of the device, the pivot ball comprising a beveled entry and exit, wherein a kite line or other connection line can be run through an aperture of the beveled entry and exit, the pivot ball rotating in the direction of movement of the fishing line.

In one embodiment, the release arm gripping mechanism comprises a first arm and a second arm, wherein the release arm is positioned between first arm and the second arm. In one embodiment, a fishing line is run through an opening of the release arm. In one embodiment, the release arm is releasable from the release arm gripping mechanism.

In one embodiment, a method of offshore fishing includes providing an offshore fishing apparatus comprising an apparatus body, an adjustable thumb screw coupled to the apparatus body, and a release arm gripping mechanism at a distal end of the apparatus body, the release arm gripping mechanism holding a release arm, and the release arm gripping mechanism being able to increase or decrease a tension on the release arm when the adjustment thumb screw is tightened or loosened. The method further comprises running a fishing line through an opening of the release arm, tightening the adjustment thumb screw such that the release arm gripping mechanism applies tension to the release arm, and increasing or decreasing the tension based on an estimated force desired to release said release arm.

In one embodiment, the method further includes running a kite line or other connection line through an aperture of a beveled entry and exit at a proximal end of the apparatus body, the beveled entry and exit being in a pivot ball which rotates in the direction of movement of the fishing line. In one embodiment, one end of the release arm is released from the release arm gripping mechanism releasing the fishing line into a water body once a fish with the necessary force to overcome the tension on the release arm is caught. In one embodiment, the release arm and fishing line are perpendicular to the kite line or connection line run through a proximal aperture of the apparatus.

BRIEF DESCRIPTION OF THE DRAWINGS

FIG. 10 is sectional view of the invention taken along line 10-10 of FIG. 2;

FIG. 11 is a section detail view of the fishing apparatus;

FIG. 12 is a section detail view of the fishing apparatus;

FIG. 13 is a perspective view of the first side of the fishing apparatus;

FIG. 14 is a perspective detailed view of the second side of the fishing apparatus;

FIG. 15 is a perspective detailed view of a part of the fishing apparatus; and

FIG. 16 is an exploded view of the primary components of the fishing apparatus.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Often in offshore fishing, the angle of the fishing line in relation to the fishing line release arm or holders and the outrigger halyard, kite line, downrigger cable or planer board line (herein referred to as "the connection line") is not aligned for optimal performance. This less than optimal angle combined with the small diameter of wire used on the release arm present in the prior art creates unnecessary stress and friction on the fishing line. The release tension adjustment range is not sufficient, precise or consistent enough to facilitate uses in the varying fishing techniques and applications. The overall weight of the prior art is significant, and has an adverse effect on the varying fishing techniques and applications.

Broadly, the current device is an offshore fishing apparatus that solves several issues present in existing fishing devices. The claimed device also rotates and/or pivots in the direction the fishing line is being pulled. This is an improvement to prior art, as the prior art is held directionally by the connection line.

The claimed device is designed so the tension applied on the fishing line release arm is precise, consistent and releases the fishing line smoothly when a fish strikes or when any event overcomes the tension placed upon the fishing line. Also, the claimed device solves the problem of misalignment relating to the fishing line, the release arm, and the connection line.

Figure 1:
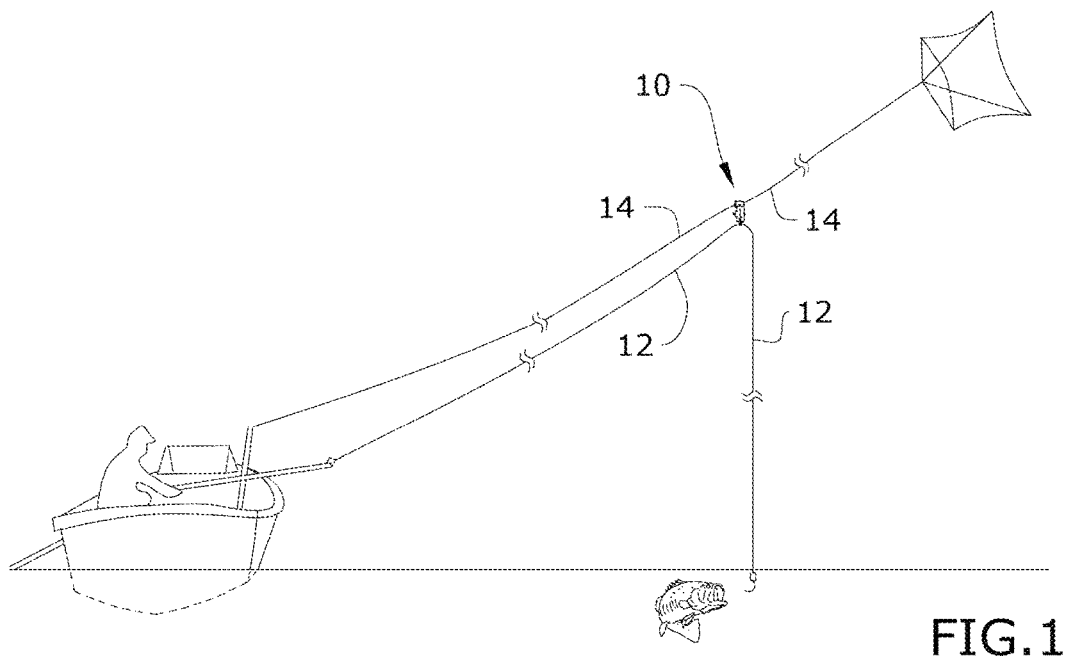
FIG. 1 is one embodiment of a fishing apparatus.

In one embodiment as shown in FIG. 1, a fishing apparatus 10 (herein referred to as the "device") is attached to a kite line or connection line 14 and a fishing line 12. A kite is attached to the connection line 14 and provides the lift necessary to keep bait close to the surface of water body 16. The fishing line 12 is dropped below the water line 16 to bait a fish 18. When live bait or a lure is taken, the force releases the fishing line 12 from the apparatus 10 and the connection line 14. A fisherman can then use a rod and reel to wind in the fishing line 12. More than one fishing line 12 can similarly be attached to one or more additional apparatuses 10, and connection line 14.

It should be understood that the device can be used in several fishing techniques where one wants a controlled release of their fishing line from a remote location. The device, for example, can be used with alternative offshore fishing devices such as outriggers, flat lines, downriggers or planer boards.

Figure 2:
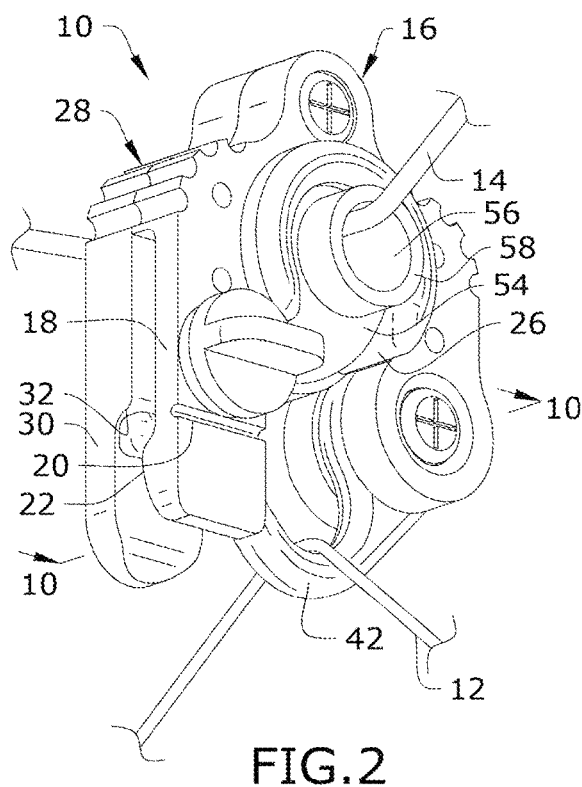
FIG. 2 is a perspective view of a first side of a fishing apparatus.
Figure 3:
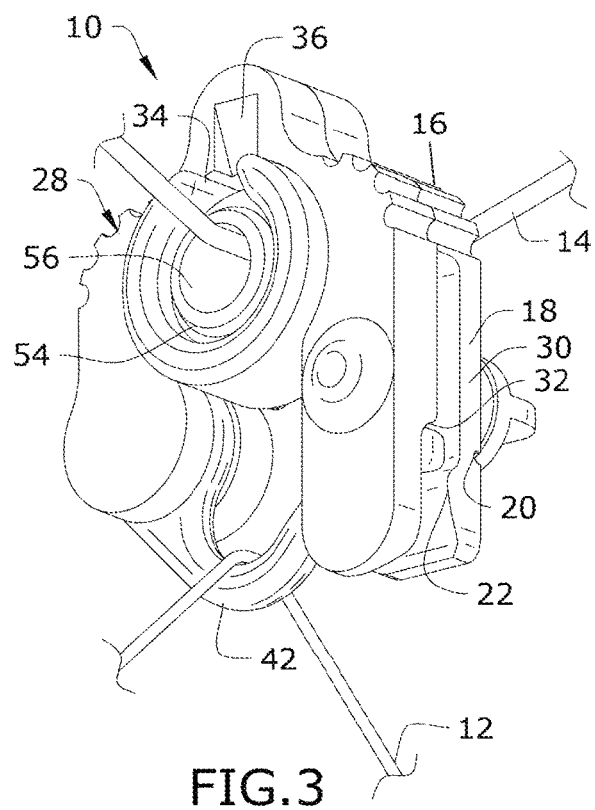
FIG. 3 is a perspective view of a second side of a fishing apparatus.

The embodiment of FIG. 2 is a perspective view of the device 10. A first half 16, is juxtaposed to a second half 28. A perspective view of the second half 28 is shown in FIG. 3.

The first half 16 and the second half 28 both include reflective weight reducing chambers. They also include beveled entries and exits 56 for the connection line 14. A pivot ball 54 is placed within the device through a ball receiver major slot 26 in the first side, and a ball receiver minor slot 34 in the second side 28. The pivot ball 54 includes a protruding collar 58 with an opening which leads to beveled entry and exit 56. Collar 58 extends from the first half 16.

Figure 4:
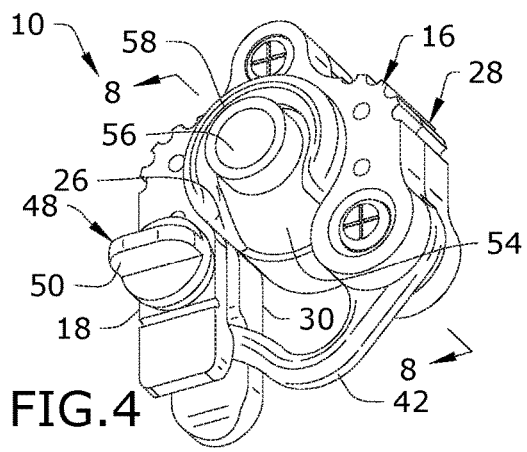
FIG. 4 is a perspective view of the fishing apparatus shown in an exemplary, initial state.

As shown in FIG. 4, first half 16 or device 10 includes a tension knob 48 with tension knob grip 50. The device also includes a first flexible arm elliptical gripper 18 ("first arm") on the first half 16 and a second arm elliptical gripper 30 ("second arm") on the second half 28. The device 10 also includes flexible arm notch 20. A close-up view of the knob 48 is shown in the embodiment of FIG. 15.

Figure 8:
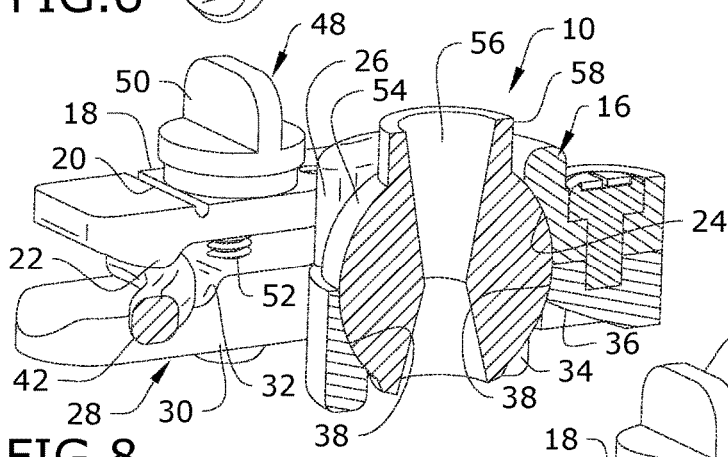
FIG. 8 is a sectional view taken along line 8-8 of FIG. 4.

As shown in the embodiments of FIG. 8 (a sectional view along 8-8 from FIG. 4) and FIG. 10 (a sectional view along 10-10 of FIG. 2), the tension knob 48 is inserted into a hole on the first half 16 and is secured using a tension adjustment thumb screw 52, which extends into a female threading 40 on the second half 28. As the tension adjustment thumb screw 52 is tightened with the adjustment knob 50, the tension placed upon the release arm 42 increases. This fine and precise adjustment action causes the release arm 42 to stay in the closed position until the tension setting is overcome. Once the tension is overcome, the release arm 42 opens freely, smoothly and crisply, thus releasing the fishing line 12.

One embodiment of the fishing line 12 being released from the release arm 42 is shown in the detailed views of the first half 16 in FIG. 13 and the second half in FIG. 14. As the knob 48 is rotated in a counter-clockwise motion to reduce the tension on the first pressure arm 18 and second pressure arm 30, the arm 42 is released or opened, thus releasing the fishing line 12. Once the tension setting is overcome, the release arm 42 opens freely and pivots about a pivot point 44, thus smoothly releasing fishing line 12.

FIG. 11 and FIG. 12 show the role of friction between the release arm 42 and a pressure arm bump 22 on arm 18. The knob 48 is used to apply more or less pressure to the arms 18 and 30. When the release arm 42 hits the pressure arm bump 22, it creates a pivot arm interference surface 46. The release arm 42 also creates an interference on arm 30 and on stop 32. Once the force of the fishing line 12 overcomes a threshold, the release arm 42 slips from the pressure arm bump 22. FIG. 11 shows the pivot arm 42 before it overcomes the threshold, and FIG. 12 shows it after it overcomes the threshold. Notch 20 on arm 18 allows further flexibility of movement for arm 18.

The release arm 42 and fishing line 12 is held closed by adjusting tension created by the diameter of the release arm 42 being slightly greater than the distance between the first arm 18 and second arm 30. As the tension adjustment screw 52 is tightened, the tension placed upon the release arm 42 will increase, keeping the release arm 42 in the closed position until the tension setting is overcome.

An experienced user can adjust the tension applied to the release arm 42, and thus the force needed to overcome that tension based on the estimated force (or weight) of the desired fish/bait being used. In one embodiment, the tension can range from 0 to approximately 25 pounds or more of necessary force to cause the release arm 42 to release from apparatus 10.

Figure 5:
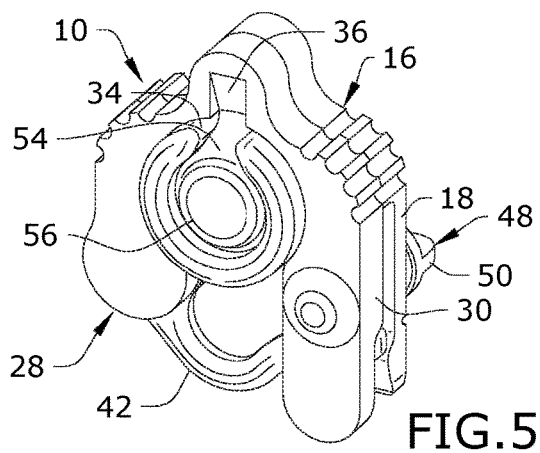
FIG. 5 is a perspective view of the fishing apparatus shown in an exemplary, initial state.
Figure 6:
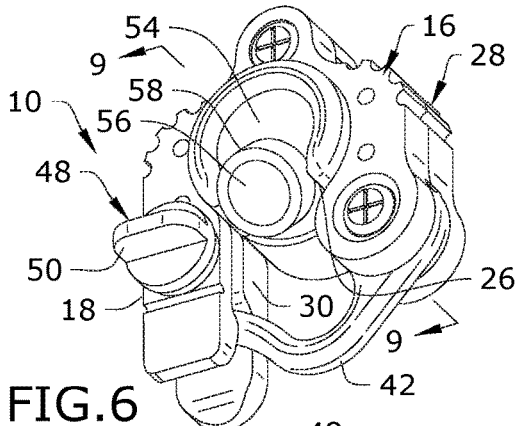
FIG. 6 is a perspective view of the fishing apparatus shown in a secondary exemplary state.
Figure 7:
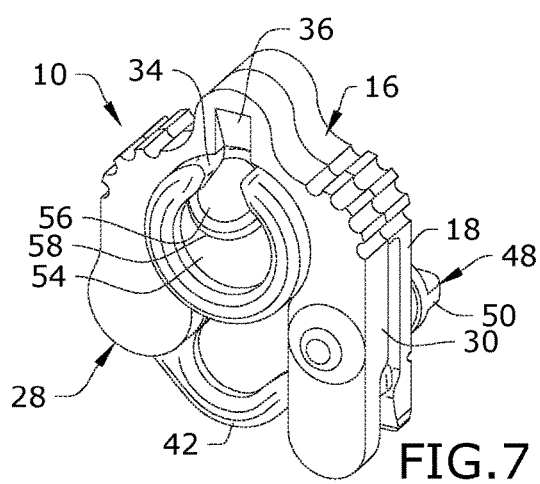
FIG. 7 is a perspective view of the fishing apparatus shown in a secondary exemplary state.

In one embodiment, the pivot ball 54 includes the beveled entry and exit 56 for the connection line 14. In one embodiment, the diameter of the beveled entry and exit 56 ranges in size from about 0.050 inches to 0.270 inches, though it can be of any suitable length or diameter. The beveled entry and exit 56 is designed for the connection line 14 and for varying size of stoppers used for multiple fishing lines from a single connection line 14. Advantageously, the beveled entry and exit 56 will also work on the variations in outrigger, downrigger, and planer board line materials and sizes. The pivot ball 54 in a first position is seen from the first half side 16 in FIG. 4. and from the second half side 28 in FIG. 5. The pivoted ball 54 in a rotated position is seen on the first side in FIG. 6 and on the second side in FIG. 7.

Figure 9:
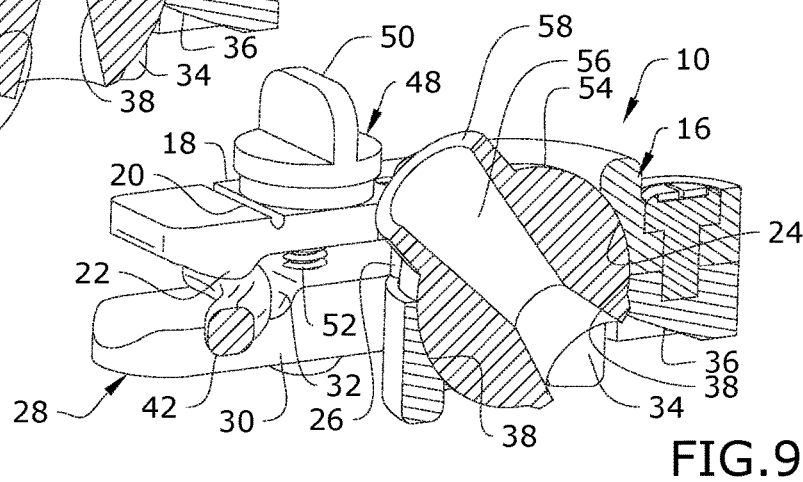
FIG. 9 is a sectional view taken along line 9-9 of FIG. 6.

A ball and socket configuration is formed by the first half 16 and second half 28 of the device. Details of this configuration are shown in the sectional views of FIG. 8 and FIG. 9 (a sectional view along 9-9 of FIG. 6). The device 10 includes a major ball receiver slot 26 and a second ball receiver slot 34 within which the pivot ball 54 is positioned. The respective slots 26 and 34 provide clearance for the pivot ball 54 to move and for the connection line 14. The ball 54 rotates against a first body slant surface 36 and fits within concavity 38 in the second half 28. Pivot ball 54 sits in concavity 24 on the first half 16. FIG. 8 shows a first non-rotated position of the ball 54 and FIG. 9 shows the ball 54 in a rotated position. The ball 54 rotates in the spherical concavities formed by both sides of the device.

One embodiment of the disassembled components of the complete device is shown in FIG. 16.

Advantageously, the invention is light weight by design and incorporates internal weight reducing chambers, as well as the uses of lightweight materials throughout, which reduce the overall weight without compromising the invention's performance. The light weight design makes the device 10 less likely to cause adverse effects on the fishing line or the device 10 to which it is attached.

In one embodiment, the device 10 is symmetrical in design and can be used by both right or left-handed people. Further, the release arm 42 makes the entire device 10 less likely to cause adverse stress on the fishing line 12 by tangling with the fishing line and/or the apparatus to which it is attached. Because the device 10 is frictionally adjustable in the rotational axis, it moves in a controlled manner towards the direction that the fishing line 12 is being pulled for optimal performance.

To use the device 10, the connection line 14 is positioned through the beveled entry and exit 56. The pivot arm 42 opens towards the fishing bait or lure.

As previously described, tension placed on the release arm 42 is achieved by adjusting the knob 48, which loosens or tightens the thumb screw 52. This loosening or tightening action of the screw 52 causes the first arm 18 and the second arm 30 to compress the release arm 42 against the pressure arm bump 22 and stop 32 to create the required tension.

Once the device 10 is installed on the connection line 14 (outrigger halyard, kite line, downrigger cable or planer board line), the user simply opens the release arm 42 and places the fishing line 12 through the opening of the release arm 42. The user then closes the release arm 42, using the knob 48 to adjust to the desired tension on the release arm 42. The user then adjusts the desired position of the pivot ball 54, if desired.

Additionally, when using the invention for kite, outrigger, downrigger, or planer board fishing, one may want to use multiples of the device 10 on a single connection line 14. This is achieved by placing several stoppers along the connection line 14. These stoppers vary in diameter with the smallest being positioned towards the kite. The beveled entry and exit 56 is manufactured with various size holes for the appropriate size for each stopper. Advantageously, the user may select the proper beveled entry and exit hole size 56 for the varying sizes of outrigger halyard material.

Further, the components of device 10 can be made of several different materials or all the same material. In one embodiment, the components can be made of forged metals or sintering of various materials. In alternative embodiments, apparatus 10 can be made using snap plastic injection connections instead of traditional securing hardware, such as screw, nuts or rivets. In an alternative embodiment, components can be epoxied, glued, ultrasonically bonded, welded or attached by any suitable means.

In alternative embodiments, modifications, such as a mirror image of the device used on a port and starboard side of a fishing vessel, may be made.

It should be understood, of course, that the foregoing relates to exemplary embodiments of the invention and that modifications may be made without departing from the spirit and scope of the invention as set forth in the following claims.

What is claimed is:

1. A fishing apparatus comprising:
   an apparatus body comprising first and second halves and a proximal end, said first half having a ball receiver major slot and said second half having a ball receiver minor slot, said ball receiver major slot and said ball receiver minor slot receive a pivot ball, said pivot ball including a beveled entry and exit and a protruding collar extending from said first half, said protruding collar having a first opening, which leads to said beveled entry and exit, a line run through said first opening of said beveled entry and exit;
   an adjustable thumb screw coupled to the apparatus body; and
   a release arm gripping mechanism at a distal end of the apparatus body, the release arm gripping mechanism holding a release arm, and the release arm gripping mechanism being able to increase or decrease a tension on the release arm when the adjustable thumb screw is tightened or loosened, said pivot ball rotating in a direction of movement of said line that is held by said release arm gripping mechanism.

2. The apparatus of claim 1 wherein the release arm gripping mechanism comprises a first arm and a second arm, wherein the release arm is positioned between first arm and the second arm.

3. The apparatus of claim 2, wherein a fishing line is run through a second opening defined by the release arm.

4. The apparatus of claim 3, wherein an end of the release arm is releasable from the release arm gripping mechanism.

* * * * *